UNITED STATES PATENT OFFICE.

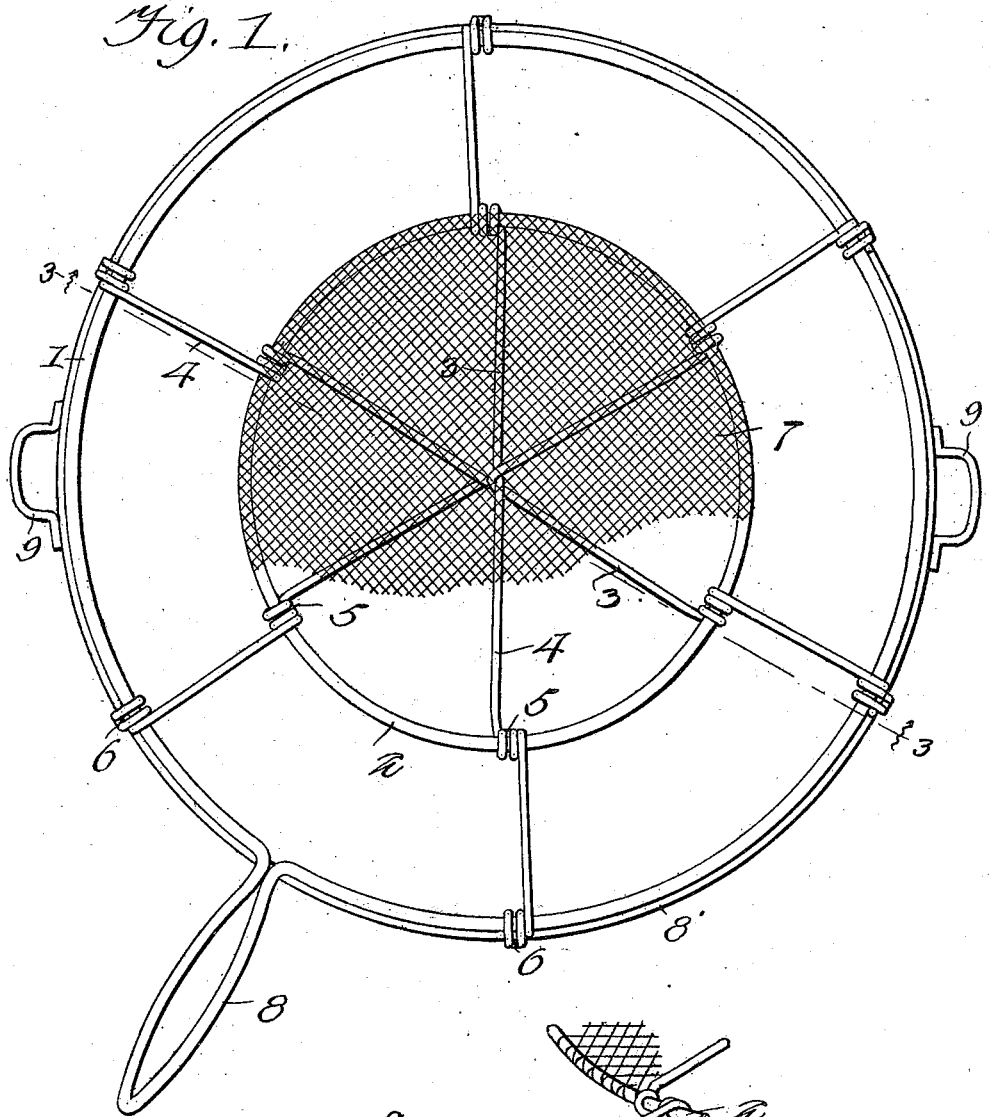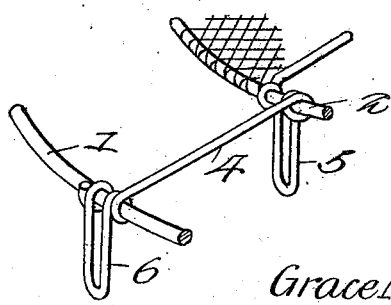

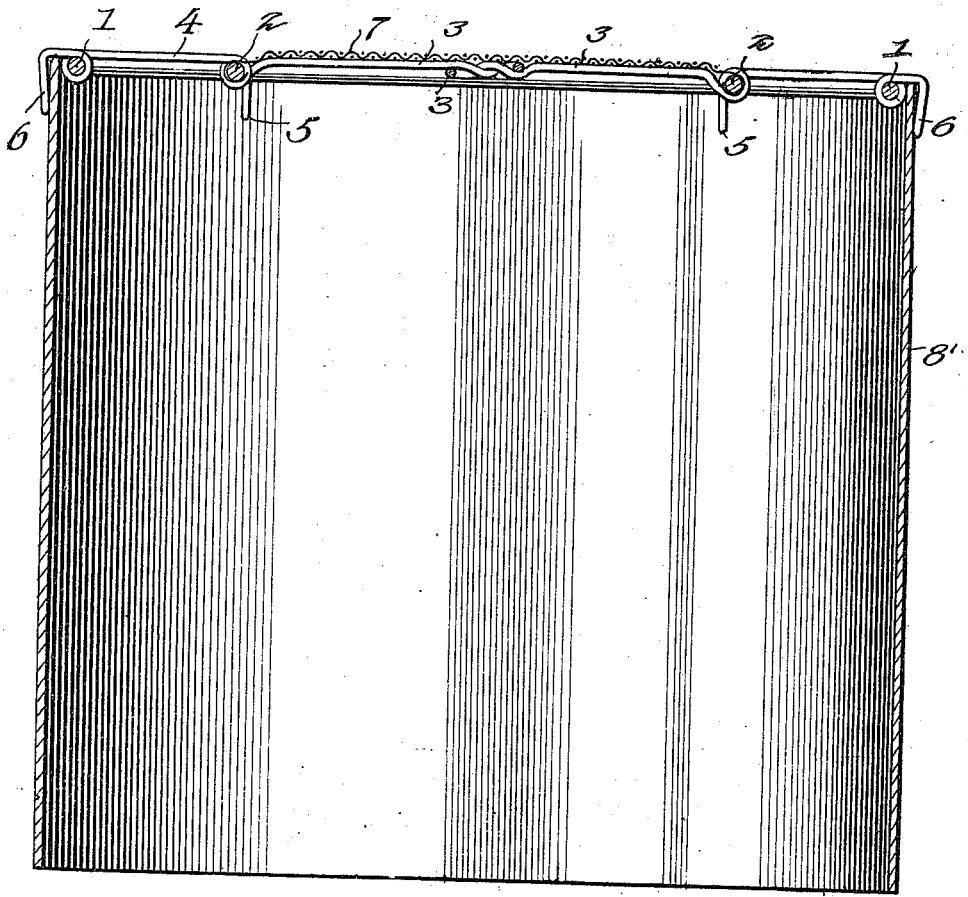

GRACE MARY F. NORTON, OF SUTHERLAND, FLORIDA.

COMBINED COOKING-UTENSIL SUPPORT AND FOOD-SUPPORT.

989,399.  Specification of Letters Patent.  Patented Apr. 11, 1911.

Application filed November 8, 1910. Serial No. 591,363.

*To all whom it may concern:*

Be it known that I, GRACE M. F. NORTON, a citizen of the United States of America, residing at Sutherland, in the county of Hillsboro and State of Florida, have invented new and useful Improvements in Combined Cooking-Utensil Supports and Food-Supports, of which the following is a specification.

This invention relates to a combined cooking utensil support and a food support, the object of the invention being to provide a device of this character which is designed to support the receptacle during the cooking operation of the food and which is also designed to support the food on a suitable platter or the like after it has been cooked.

In the drawing, forming a portion of this specification and in which like numerals of reference indicate similar parts in the several views:—Figure 1 is a plan view of the support. Fig. 2 is a perspective view of a portion of the support. Fig. 3 is a section taken on the line 3—3 of Fig. 1.

My improved support consists of an outer ring 1 and an inner ring 2 which are connected with each other by the sector like elements 3. These elements are each formed of wire, and as illustrated, their inner ends are intertwisted. The arms 4 of the members radiate from the center of the structure and they are twisted about the inner ring 2 and formed to provide depending feet 5. From the ring 2 the arms 4 of the said members are extended outwardly and twisted about the outer ring 1 and formed to provide depending feet 6. A panel 7 of wire or suitable foraminous material entirely occupies the central portion of the support, the edge portions of the said panel being preferably secured to the inner ring 2. The outer ring 1 is formed to provide a suitable handle 8 by means of which the device may be lifted to and from the stove.

The device described and illustrated herein is designed primarily to be used in connection with cooking stoves and as a support for griddles, broilers or the like. Its use will be found most desirable in that the utensil will be held out of contact with the stove to prevent a possible scorching of the food during the cooking operation. The panel or foraminous portion 7 may be used as a support for toast or other such food stuffs which should be kept warm immediately previous to the serving.

In connection with the above described support, I provide a hollow cylinder-like member 8'. This member is open at both ends and is designed to rest upon the stove, the object being to hold the support spaced from the stove sufficiently to prevent burning of the food stuffs. This hollow cylinder-like member also provides means whereby the heat from the stove will be concentrated within the hollow cylinder. The heat in this way will be most effective and a rapid cooking of the food stuffs may be obtained. In lieu of the support described any ordinary griddle may be substituted therefor. The member 8' is of a construction which will permit the support to fit the same at the upper end thereof, as clearly shown. With reference to Fig. 3 it will be seen that the legs 6 fit over the walls of the members 8' so as to prevent the support from accidental displacement. The member 8' is provided with suitable handles 9. The member 8' may be made of sheet metal, clay or any such material which may be found most desirable for the purpose.

I claim:—

1. A support of the character described comprising inner and outer spaced rings, members connecting the rings with each other and formed to provide supporting feet, and a central panel supported by the said members and by the said inner ring.

2. A support of the character described comprising concentric rings, members of sector form intertwisted with each other and with the said rings and formed to provide depending supporting feet, and a central panel secured to the members and to one of the said concentric rings.

3. The combination with a hollow cylindrical member open at both ends; of a support comprising inner and outer spaced rings, members connecting the rings with each other and formed to provide depending leg portions extending over the edge of the hollow member and embracing the same upon its exterior surface, and a central panel supported by one of the rings and by the said members.

In testimony whereof I affix my signature in presence of two witnesses.

GRACE MARY F. NORTON.

Witnesses:
J. C. CRAVER,
FLORRIE CRAVER.

Copies of this patent may be obtained for five cents each, by addressing the "Commissioner of Patents, Washington, D. C."